US011876694B1

(12) United States Patent
Kannan et al.

(10) Patent No.: US 11,876,694 B1
(45) Date of Patent: Jan. 16, 2024

(54) LATENCY MONITORING AND REPORTING FOR DISTRIBUTED GATEWAYS

(71) Applicant: Microsoft Technology Licensing, LLC, Redmond, WA (US)

(72) Inventors: Gopikrishna Kannan, Redmond, WA (US); Vijayan Ramakrishnan, Milpitas, CA (US); Sudeep Shrikrishna Patwardhan, Fremont, WA (US); Girish Manoharlal Motwani, Pleasanton, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/854,854

(22) Filed: Jun. 30, 2022

(51) Int. Cl.
*H04L 43/0864* (2022.01)
*H04L 43/0817* (2022.01)
*H04L 43/0894* (2022.01)
*H04L 43/10* (2022.01)

(52) U.S. Cl.
CPC ...... *H04L 43/0864* (2013.01); *H04L 43/0817* (2013.01); *H04L 43/0894* (2013.01); *H04L 43/10* (2013.01)

(58) Field of Classification Search
None
See application file for complete search history.

(56) References Cited

U.S. PATENT DOCUMENTS

| 8,958,293 B1* | 2/2015 | Anderson | H04L 67/1001 370/230 |
| 11,240,163 B2* | 2/2022 | Chen | H04L 47/283 |
| 2020/0036615 A1* | 1/2020 | Lewis | H04L 63/0218 |

OTHER PUBLICATIONS

Author: Teixeira et al. Title: "End-to-End Informed VM Selection in Compute Clouds" Publisher: IEEE ICC 2015 (Year: 2015).*

* cited by examiner

*Primary Examiner* — John A Follansbee
*Assistant Examiner* — Kamal M Hossain
(74) *Attorney, Agent, or Firm* — Holzer Patel Drennan

(57) ABSTRACT

A method for measuring latency of a data packet attributable to transit of the data packet through a distributed gateway includes transmitting, from a first virtual machine of a plurality of virtual machines executing different instances of a gateway, a ping request to each of the other virtual machines. A ping reply is received at the first virtual machine in association with each of the transmitted ping requests, and the first virtual machine measures a round-trip transit (RTT) time between transmission of each one of the ping requests and receipt of the corresponding ping response. The method further provides for publishing a latency statistic for the distributed gateway that is generated based on an aggregation of the RTT times measured by the first virtual machine.

16 Claims, 6 Drawing Sheets

LATENCY MONITORING AND REPORTING FOR DISTRIBUTED GATEWAYS

BACKGROUND

A gateway consists of one or more hardware devices that function as a gate among various available networks, such as between the internet and a private computing environment. Various software as a services (SaaS) platforms offer gateway services that perform various types of operations on customer through-traffic, such as load balancing, packet inspection, actions to facilitate secure connectivity between endpoints, etc. Some of these gateway services are distributed in the sense that a workload performed by a gateway on behalf of a user is distributed among multiple different machines performing processing operations of the gateway service. Some distributed gateway services are also scalable in the sense that the number of machines supporting a workload for an individual user may be dynamically scaled up or down in response to increases and decreases in the size of the workload associated with the individual user.

SUMMARY

According to one implementation, a method for measuring latency incurred by a data packet passing through a distributed gateway includes transmitting, from a first virtual machine of a plurality of virtual machines executing different instances of a gateway, a ping request to each of the other virtual machines. In response to each of the transmitted ping requests, the first virtual machine receives a corresponding ping response and measures a round-trip transit (RTT) time between transmission of each of the ping requests and receipt of the corresponding ping response. The method further provides for publishing a latency statistic for the distributed gateway, the latency statistic being based on an aggregation of the RTT times measured by the first virtual machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
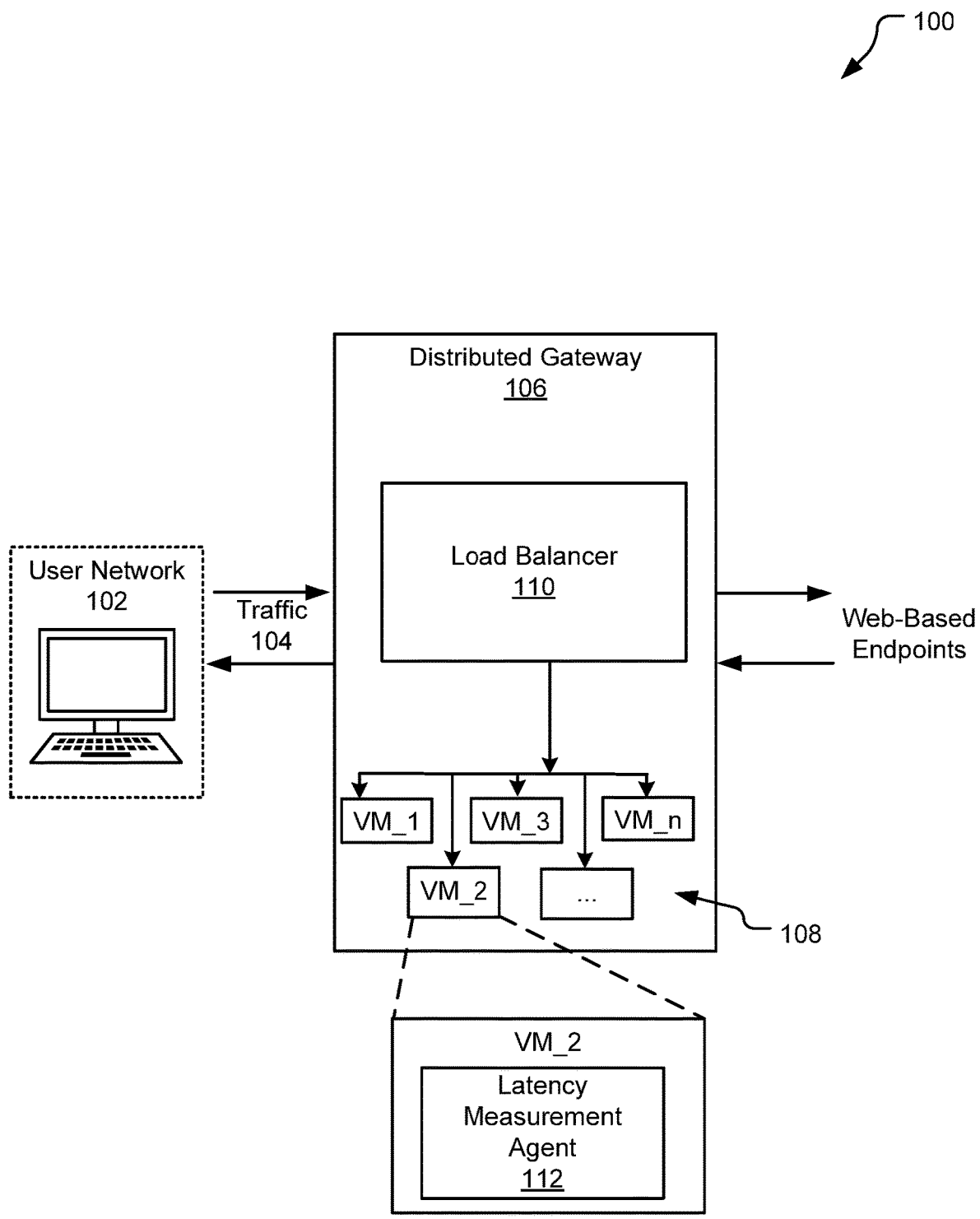
FIG. 1 illustrates an example distributed system with a distributed gateway that self-determines latency that is incurred by data packet passing through the distributed gateway.

Users often expect cloud-based gateway services to be available at all times with zero disruption to their respective traffic flows. In reality, however, gateway services do impart latencies, and customers desire visibility into the severity of these latencies. This is a challenging technical problem as computing packet latency using inline metrics can cause significant overheads (e.g., due to time-consuming measurements) that actually add latency to customer data packets during peak traffic.

Since total latency scales with the number of packets subjected to latency measurements, some approaches to gateway latency measurement provide for random sampling of user data packets for such measurements. However, even these approaches have proven problematic for time-sensitive traffic flows. In addition, these approaches to latency measurement are also plagued by inaccuracies. Since it is difficult to get latency measurements at in/out edge points (e.g., time between a packet entering the gateway and leaving the gateway), latency measurements are commonly performed at locations external to the gateway, such as at an application executing on the user's machine that determines a round trip time between the user's machine and an internet destination endpoint on an opposite side of the gateway. However, these end-to-end measurements lack accuracy because they may capture latencies that are attributable to components external to the gateway, such as the user's router, web client, server, etc.

Further compounding the difficulty of measuring gateway-imparted latency is the fact that some distributed gateway services are scalable. Latency of a distributed gateway depends upon all of the virtual machines (VMs) supporting a workload (e.g., because the latency contributions of individual VMs may differ). However, an application external to a distributed gateway gathering latency statistics for the distributed gateway has no visibility into how many virtual machines are supporting a user workload at a given point in time and may measure latency associated with a single path through the gateway (e.g., through a single one of the VMs), which may be different from the latency of other paths through the gateway.

The herein disclosed technology proposes a measurement scheme for accurately measuring data packet latency attributable to a distributed gateway in an efficient manner that does not contribute additional latency to customer data packets in transit through the gateway. According to one implementation, the disclosed latency measurement scheme provides for collecting of a number of latency measurements (e.g., data packet round-trip travel times (RTTs)) at hardware components that are entirely internal to a distributed gateway. Localizing these measurements within the distributed gateway ensures that computed latency statistic(s) are not inclusive of latencies attributable to hardware components external to the distributed gateway, such as a user's router or Web client.

In one implementation, a latency measurement agent is executed on each of multiple virtual machines within a distributed gateway supporting a same user workload. The latency measurement agents communicate with one another to determine various round-trip travel times between different pairs of the virtual machines. Because the data packets subjected to measurements are separate from the user traffic that is processed by the gateway, the latency measurements do not themselves contribute additional latency to the user data. At the same time, the latency measurements still collectively provide a realistic picture of the latency that is associated with processing at each virtual machine within the distributed gateway at a given point in time. When published to a common entity, this information can be aggregated and used to accurately estimate the latency of the distributed gateway. In a scalable distributed gateway system, this latency statistic can be dynamically re-determined as the number of virtual machines supporting the distributed gateway scales up and down in response to changes in the workload.

FIG. 1 illustrates an example distributed system 100 with a distributed gateway 106 that self-determines latency that is incurred by data packet passing through the distributed gateway 106. In one implementation, the distributed gateway 106 is a cloud-based service offered by a gateway service provider (not shown) to various subscribing customers. The distributed gateway 106 represents a gateway that is configured to service traffic associated with a single customer or entity associated with a user network 102 (e.g., traffic flowing to or from the user network 102). The gateway service provider may configure a different distributed gateway for each different subscribing customer.

In one implementation, service(s) provided by the distributed gateway 106 are supported by a group of cloud-based hardware resources that perform actions on the customer traffic 104 as the user traffic 104 passes through the distributed gateway. One example of a distributed gateway is a web application firewall, such as Microsoft's Azure Firewall®, which acts as a security gateway inspecting through-traffic in route between user machines and web-based endpoints. Another example of a distributed gateway is a Bastion gateway within Microsoft's Azure Bastion®, which provides secure RDP and SSH connectivity between a web-based user portal and virtual machines in a provisioned virtual network. Still another example of distributed gateway is a Layer 7 Load Balancer that performs load balancing on behalf of a web application supported by multiple servers.

For each different customer (e.g., the customer associated with the user network 102), the gateway service provider configures a distributed gateway, such as the distributed gateway 106, by instantiating a different instance of a gateway on each of multiple virtual machines (VMs 108). The instances of the gateway executing on each of the VMs 108 are also referred to herein as "nodes" of the distributed gateway 106. Each of the different nodes may be configured to perform similar or identical functionality with respect to received portion of the user traffic 104 traveling to or from the user network 102.

The distributed gateway 106 further includes a load balancer 110 that distributes the user traffic 104 of the user network 102 among the different instances of the gateway executing on the different VMs 108. In one implementation, the number of gateway instances (number of VMs) within the distributed gateway 106 is a static uniform allocation, such as based on a customer subscription level. In other implementation, the distributed gateway 106 is scalable in response to fluctuations in the volume of the user traffic 104 associated with the user network 102. For example, the load balancer 110 may alter a hardware allocation to add or remove select VMs from the group of the VMs 108 allocated to perform the processing operations of the distributed gateway 106 on behalf of the user network 102.

According to one implementation, a latency measurement agent 112 is executed on each of the VMs 108 performing latency monitoring operations on behalf of the distributed gateway 106. In one implementation, the latency measurement agent 112 is a body of code that executes external to and in parallel with the distributed gateway logic executing on the VMs 108. In other implementations, the latency measurement agent 112 is a subroutine that performs measurements on behalf of the distributed gateway. Regardless of implementation, the latency measurement agent 112 may be understood as being functionally responsible for carrying out repeated sets of latency measurements, such as on a periodic basis (e.g., every 1-2 seconds).

In one implementation, the latency measurement agent 112 initiates a group of measurements by "pinging" each of the other VMs in the distributed gateway 106. Pinging involves sending a "ping request" to a destination VM (e.g., one of the VMs 108). For example, the ping request may be an internet control message protocol (ICMP) packet or other suitable ping protocol. The ping request is received at the destination VM and answered, by the destination VM, with another packet referred to herein as a "ping response." For example, the ping response may be another ICMP packet. The round trip transit (RTT) time for conveying the ping request to a destination VM and receiving a ping response back from the destination VM is generally representative of a latency incurred by a packet of the user traffic that is directed to and processed by the destination VM.

According to one implementation, the latency measurement agent 112 on an individual one of the VMs 108 transmits a ping request to each of the other VMs 108 within the distributed gateway 106. Upon receipt of the ping request, each of the VMs respond with a ping response. For each ping response received, the latency measurement agent 112 determines a round-trip travel (RTT) time between transmission of the ping request and receipt of the corresponding ping response. Latency measurements determined by the latency measurement agent 112 are, in one implementation, transmitted to a common location within or external to the distributed gateway 106 where the measurements of the latency measurement agent 112 are combined with other like-measurements determined by latency measurement agents executing on the other VMs 108 within the distributed gateway 106. These latency measurements are aggregated, such as to determine a latency statistic for the distributed gateway as a whole. For example, the latency measurements may be averaged to estimate an average latency incurred by a data packet traveling through the distributed gateway and/or otherwise analyzed to determine other latency metrics (e.g., minimum RRT reported, maximum RRT reported). The determined latency metrics for the distributed gateway 106 may, in turn, be published in a location accessible to the customer operating within the user network 102.

According to one implementation, the load balancer 110 is an inactive component (e.g., static set of routing rules) that does not itself contribute any latency to the data packets in the distributed gateway 106. Provided the load balancer 110 (e.g., as an inactive component) evenly distributes the user traffic 104 among the VMs 108, the above-described echo/reply RTT time, averaged across all pairs of VMs executing active instances of the gateway, is representative of the average latency that would be experienced by a data packet of the user traffic 104 passing through the distributed gateway 106. In contrast, measuring travel time of any single (e.g., randomly-selected) data packet of the user traffic 104 would provide a measurement of the latency contributions associated with a single path (e.g., a single VM) through the distributed gateway 106, which is not necessarily representative of the latency that would be experienced by packets traversing the distributed gateway 106 via other instances of the gateway executed by the other remaining VMs 108.

Notably, the above-described echo/reply RTT time measurements among pairs of nodes of the distributed gateway 106 are performed entirely internal to the gateway and by the code of the latency measurement agent 112 which is, in one implementation, executing within each of the different instances of the gateway on the different VMs 108. Consequently, the measured RTT times are not inclusive of any latencies potentially attributable to hardware external to the gateway. This improves the accuracy of the determined latency statistic (e.g., the average latency) for the distributed gateway 106 as compared to other approaches that rely on in-line measurements of user data packets, such as by measuring round trip travel time between two applications executing on opposite sides of the distributed gateway 106. Moreover, since the RTT time measurements are not performed on data packets selected from the user traffic 104, the RTT measurements do not contribute further latency to the user traffic 104.

Figure 2:
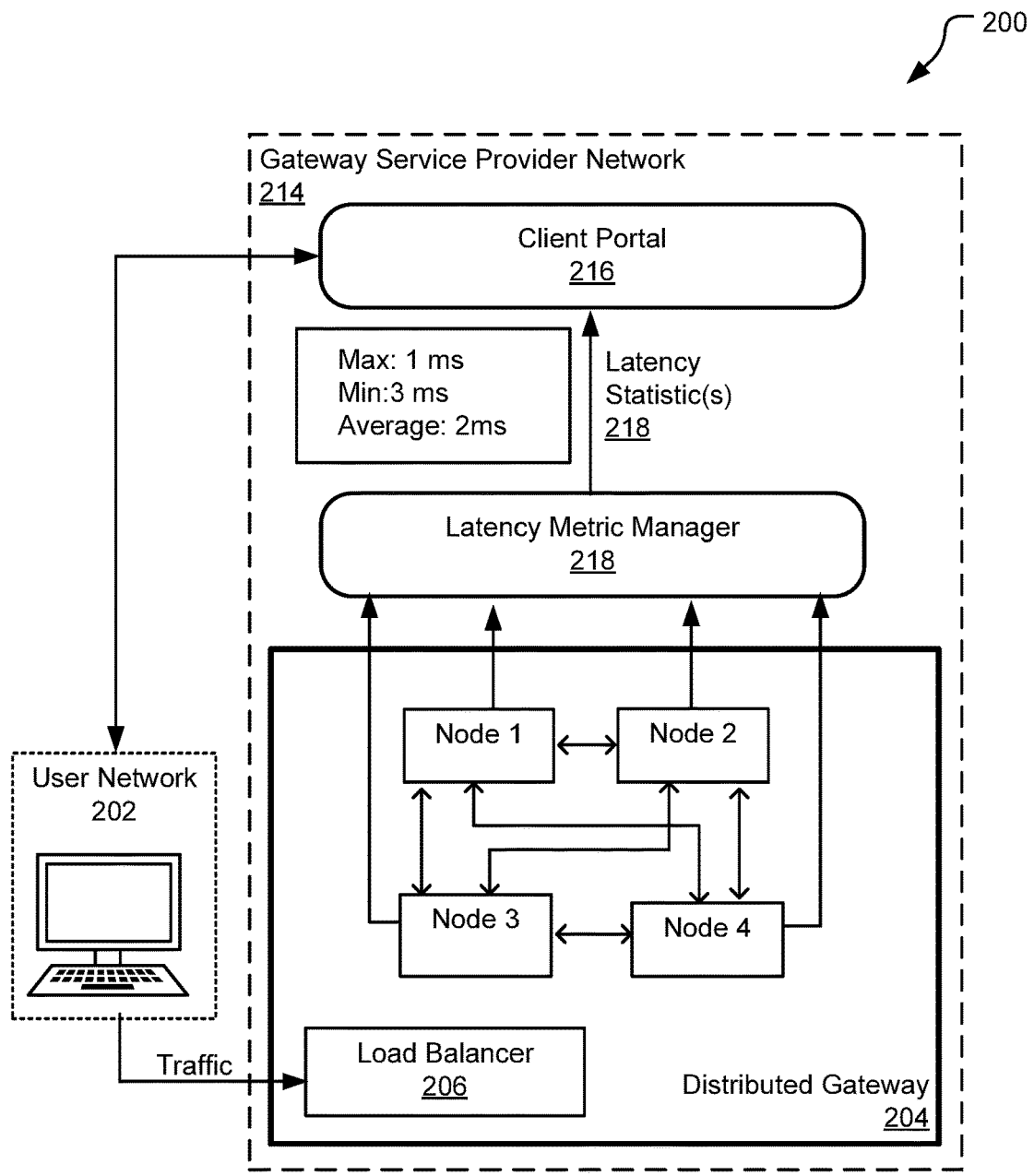
FIG. 2 illustrates an example distributed gateway system with a distributed gateway that self-measures one or more latency statistics associated with traffic of a user network flowing through the distributed gateway.

FIG. 2 illustrates an example distributed gateway system 200 with a distributed gateway 202 that self-measures one or more latency statistics associated with traffic of a user network 202 flowing through the distributed gateway. By example, the distributed gateway 202 is shown to include four nodes (1-4) that may each be understood as being a different instance of a same gateway instantiated on a different virtual machine. Traffic of the customer traveling to or from the user network 202 is intercepted by a load balancer 206 which is, in the illustrated implementation, an inactive component that does not contribute latency to the data packets that it receives. An example of an inactive component that performs load balancing is a field-programmable gate array (FPGA)-based software-defined networking stack that defines rules in hardware that can be applied to route network traffic as the traffic enters and leaves the virtual machines in the distributed gateway 202. When the load balancer 206 is applied inactively in this manner, there is no queuing of traffic at the load balancer 206 and the load balancing actions do not impact overall latency.

The nodes (1-4) of the distributed gateway communicate with one another and perform measurements of round-trip travel (RTT) times to and from different pairs of the nodes, such as per the echo/reply requests described above with respect to FIG. 1. For example, a latency measurement agent executing on node 1 may ping each of nodes 2, 3, and 4, measure a RTT time between transmission of the ping (e.g., a ping request) and the receipt of a corresponding reply from each of nodes 2, 3, and 4. In one implementation, the same or similar actions are performed by each of the other nodes (e.g., nodes 2, 3, and 4) in the distributed gateway 204, and each of the nodes then transmits its determined RTT times to a latency metric manager 218, which performs actions for aggregating the RTT times to generating one or more latency statistic(s) 218 and for publishing the latency statistics 218 to a client portal 216.

In FIG. 2, the latency metric manager 218 is shown to be external to the distribute gateway 204 but internal to a gateway service provider network 214 that configures the distributed gateway 204 on behalf of the customer associated with the user network 202. In another implementation, the latency metric manager 218 is executed on one of the nodes of the distributed gateway 204.

In one implementation, the latency metric manager 218 receives RTT measurements collected by each node (e.g., node 1-node 4) within the distributed gateway 202, and the measurements collected by each node include a RTT time between that node and every other node that exists within the distributed gateway 204. The latency metric manager 218 aggregates these measurements, such as to determine an average RTT time that is representative of the average latency experienced by a data packet when passing through the distributed gateway 204. In addition to or in lieu of the average RTT time between pairs of the nodes, the latency metric manager 218 may determine and report other metrics as well, such as the minimum and/or maximum observed latency (e.g., the min/max RTT times of the collection of measurements by all nodes in the distributed gateway 204).

In at least one implementation, the number of nodes within the distributed gateway is dynamically scaled in response to fluctuations in the volume of traffic received from a user network. For example, nodes may be added when traffic of the user network 202 increases by a threshold amount or removed when the traffic decreases by a threshold amount. In such systems, the latency statistics 218 may be dynamically re-determined responsive to each change in the number of nodes (VMs) within the distributed gateway. For example, the latency metric manager 218 may transmit an instruction to all nodes of the distributed gateway to initiate the above-described latency measurements (RTT times to the other nodes) each time one or more nodes are added or removed.

In the illustrated implementation, the latency statistics 218 are published to the client portal 216 which is accessible to the customer associated with the user network 202, such as by providing credentials to log into a web-based account associated with a subscription to the services provided by the gateway service provider network 214. In other implementations, the latency statistics 218 are communicated to the customer associated with the user network 202 in other ways, such as via inclusion in written reports transmitted to the customer via email or any other suitable communicative means.

Figure 3:
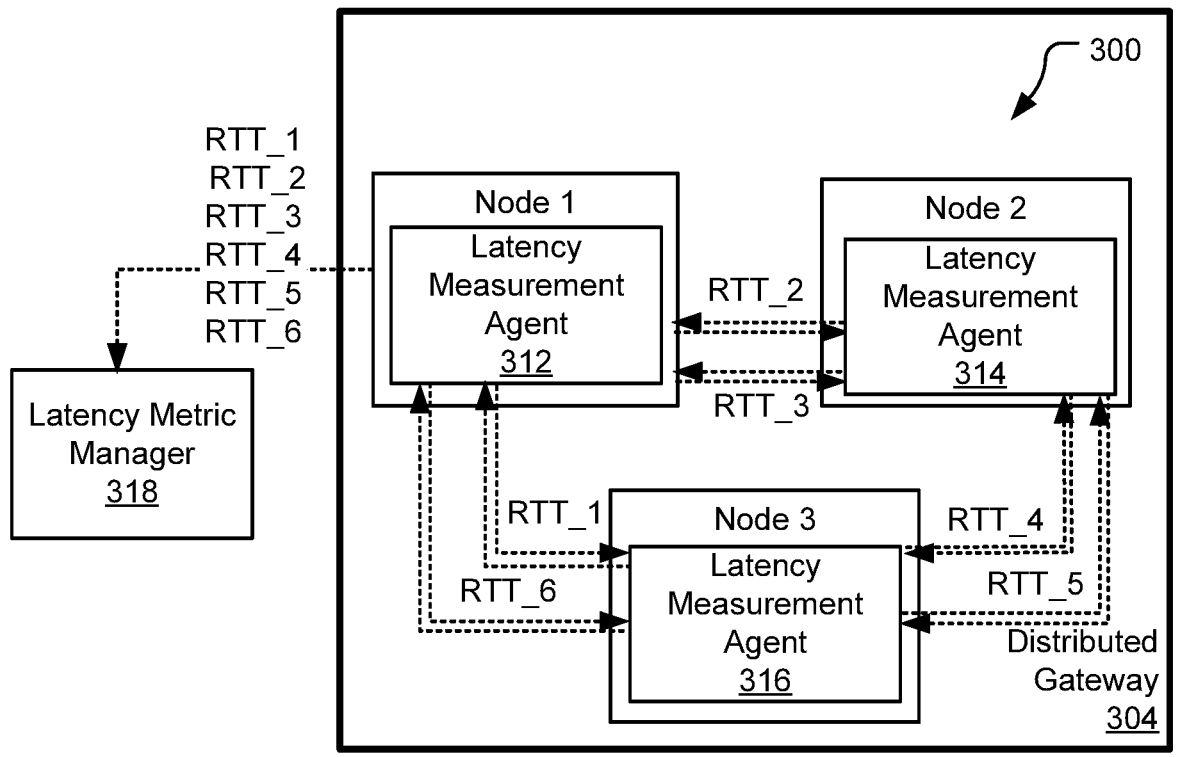
FIG. 3 illustrates example operations of nodes within a distributed gateway that are configured to determine a latency statistic for the distributed gateway.

FIG. 3 illustrates example operations 300 of nodes within a distributed gateway 304 that are configured to determine a latency statistic for the distributed gateway 304. Similar to the other systems described with respect to FIG. 1-3, the distributed gateway 304 may be understood as including an inactive load balancing component (not shown) that distributes traffic of a customer network (not shown) among various nodes of the distributed gateway 304. By example, the distributed gateway 304 is shown to include three nodes but may, in other implementation, include any number of nodes and may, in some implementations, be configured to dynamically add or remove nodes from the distributed gateway 304 in response to fluctuations in the traffic that is received in association with the customer network serviced by the distributed gateway. Features of the distributed gateway 304 not specifically described with respect to FIG. 3 may be understood as being the same or similar to features of other distributed gateways described herein.

In one implementation, each node of the distributed gateway 302 executes a different instance of a gateway. A latency measurement agent (e.g., latency measurement agents 312, 314, 316) executes within each instance of the gateway. Each of the latency measurement agents 312, 314, and 316 are configured to each perform a set of latency measurements in association with a same time interval. For example, the latency measurement agents 312, 314, and 316 may jointly initiate their respective latency measurements at a set time, periodically at set intervals (e.g., every 1-2 seconds), responsive to external instruction received at all nodes, responsive to set trigger events detected by all nodes, etc.

By example, the distributed gateway 304 illustrates a number of peer-to-peer latency measurements (RTT_1 through RTT_6) that are all performed by the latency measurement agents 312, 314, and 316 in association with a same time interval. In this implementation, each of the nodes in the distributed gateway 304 measures a round-trip transit (RTT) time to and from each one of the other remaining nodes in the system. Since there three nodes in the distributed gateway 304, each of the nodes performs two measurements. A latency measurement is initiated by sending a ping request from a source node to a destination node, and the destination node responds to the received ping request by transmitting a ping response back to the source node. The source node measures the total RTT time between its transmission of the ping request and its receipt of the corresponding ping response.

As shown in FIG. 3, node 1 transmits a ping request to each of nodes 2 and 3, and nodes 2 and 3 respond by sending a ping response back to node 1. From this, node 1 measures RTT_1 and RTT_2. In a same corresponding time period, node 2 transmits a ping request to each of nodes 1 and 3, and nodes 1 and 3 both respond by sending a ping response back to node 1. From this, node 2 measures RTT_3 and RTT_4. In the same corresponding time period, node 3 transmits a ping request to each of nodes 1 and, respectively. Nodes 1 and 2 respond to these ping requests by sending a ping response back to node 3. From this, node 3 measures RTT_5 and RTT_6. All six of these measurements (representing the bidirectional round-trip travel times between each pair of nodes in the distributed gateway) are transmitted to the latency statistic manager 318. The latency statistic manager 318 is shown to be external to the distributed gateway 304 but may, in some implementation, be executed on one of the nodes within the distributed gateway 304.

The latency statistic manager 318 aggregates the six received RTT measurements, such as by computing an average and/or by determining one or more other representative latency statistics. These latency statistics are, in turn, published to a location accessible to the customer serviced by the distributed gateway 304.

Notably, the RRT times measured inherently incorporate both travel time for the ping request and ping response as well as processing time (e.g., waiting for the destination host to response). Since travel times remain relatively static, fluctuations in the measured RTT times are due primarily to fluctuations in the processing time along the associated path. Notably, there may exist deviations in the travel time of a given ping request/ping reply as compared to the travel time of a user data packet processed by a single node due to the fact that the associated travel paths are slightly different. However, the fluctuations in processing time equally affect the measured RTT time to and from a given node and a user data packet that is processed by that same node. Therefore, fluctuations in the average latency statistic computed as described above (e.g., by averaging RTT times to and from all nodes) do accurately correspond to fluctuations in the actual latency that a user data packet is subjected to.

In some implementations, the latency statistic manager 318 collects one or more additional measurements performed on packets of the user traffic and uses these to verify and/or adjust the latency statistic that is computed based on the RTT times (e.g., as described above). For example, a small number of user data packets may be randomly selected (e.g., 1 out of every 10,000), and the distributed gateway or an external application (e.g., on the user machine) may perform actions to measure actual transit time of the randomly-selected user data packets through the distributed gateway 304.

In one implementation of the above, the distributed gateway 304 exists within the virtual network of a cloud-based gateway service. Edge devices are positioned in proximity to the boundaries of the distributed gateway and used to measure a time differential for each of the selected user data packets between the packet's entry into and exit from the distributed gateway 304. The measured average travel times for these measured user data packets can then be used to verify accuracy of and/or adjust the latency statistic (e.g., the average latency) computed per the aggregated RTT measurements, as shown in FIG. 3. Since both methods should, in theory, capture the same processing delays, it can be assumed that fluctuations between the two methods is attributable to differences in packet travel time along slightly different paths. In one implementation, the latency statistic computed using the RTT methodology of FIG. 3 is adjusted to account for a difference between the average RTT times measured by the latency measurement agents on each of the nodes and an average measured travel time of a user data packet through the distributed gateway.

Figure 4:
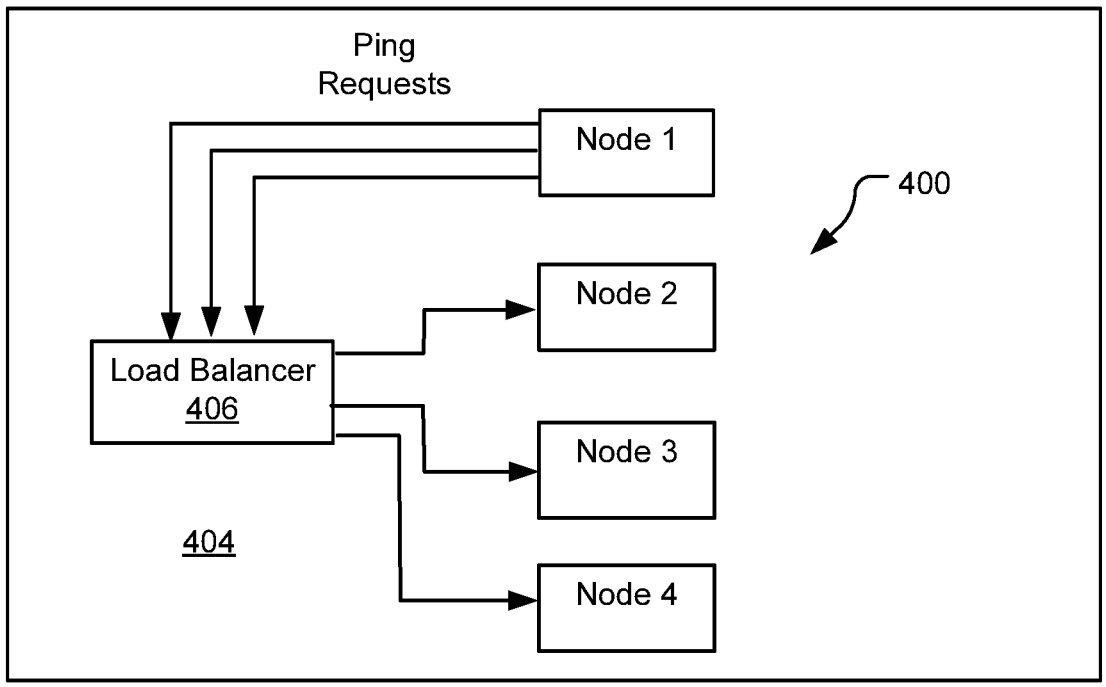
FIG. 4 illustrates example operations for determining a latency statistic for a distributed gateway.
Figure 4:
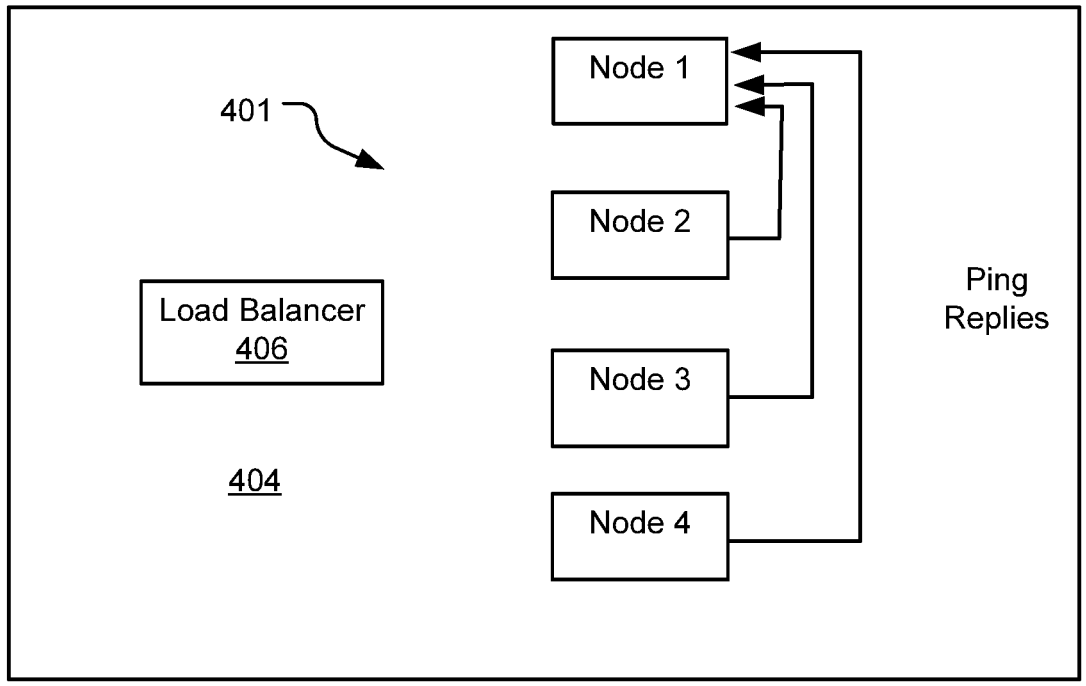

FIG. 4 illustrates example operations 400, 401 for determining a latency statistic for a distributed gateway 404. The distributed gateway 404 differs from the previously-described distributed gateways in that it includes a load balancer 406 that is an active component rather than an inactive component. As used herein, an "active component" reference to a component that includes a processor that executes instructions and that has the potential to contribute latency to the traffic passing through the distributed gateway 404. The load balancer 406 receives and distributes traffic of the user network among nodes of the distributed gateway 404. By example, the distributed gateway 404 is shown to have four nodes each executing an identical instance of a gateway. In other implementations, the distributed gateway 404 may include any number of nodes and/or be dynamically scalable in response to fluctuations in the volume of traffic received from a user network.

In one implementation, each of the nodes includes a latency measurement agent that performs latency measurements with respect to all other nodes in the distributed gateway 404. The operations 400, 401 illustrate exemplary operations performed by a single one of the latency measurement agents in a single node (node 1). However, the same actions illustrated with respect to node 1 may also be understood as being concurrently or sequentially performed with respect to each of the four nodes in the distributed gateway.

As illustrated by the operations 400, the latency measurement agent in node 1 transmits a ping request to each other node within the distributed gateway 404. In this configuration, the ping requests are transmitted to the load balancer 406, and the load balancer 406 selects a respective target node endpoint for each ping request. With knowledge of the routing algorithm implemented by the load balancer 406, a developer may design the latency measurement agent executing on each node in a manner that ensures that a series of ping requests sent from a same source (e.g., Node 1) are redirected by the load balancer 406 to all of the different nodes in the distributed gateway to achieve full coverage of the ping requests and replies, as shown in FIGS. 4A and 4B.

As shown by the operations 401, the target node endpoints each respond to the received ping request by transmitting a ping response directly back to node 1. The latency measurement agent on node 1 measures the round-trip travel time between transmission of each of the ping requests and receipt of the correspond ping response, and these measurements are aggregated with other similar measurements to derive a latency statistic for the distributed gateway 404, such as in the manner discussed with respect to any of FIG. 1-3.

Transmitting the ping requests through the load balancer 406, as shown, ensures that the resulting latency measurement is representative of latencies contributed by the load balancer 406 as well as the destination nodes (2, 3, 4) along each respective path. Since the user traffic also flows through the load balancer 406 when passing through the distributed gateway 404, it can be assumed that the user traffic is also subjected to any latency that is contributed by the load balancer 406. For this reason, measuring the RTT times along the illustrated paths provides for more accurate representation of the latencies experienced by the user traffic.

Other features of the distributed gateway 404 not specifically described with respect to FIG. 4 may be assumed to be the same or similar to other distributed gateways described herein.

Figure 5:
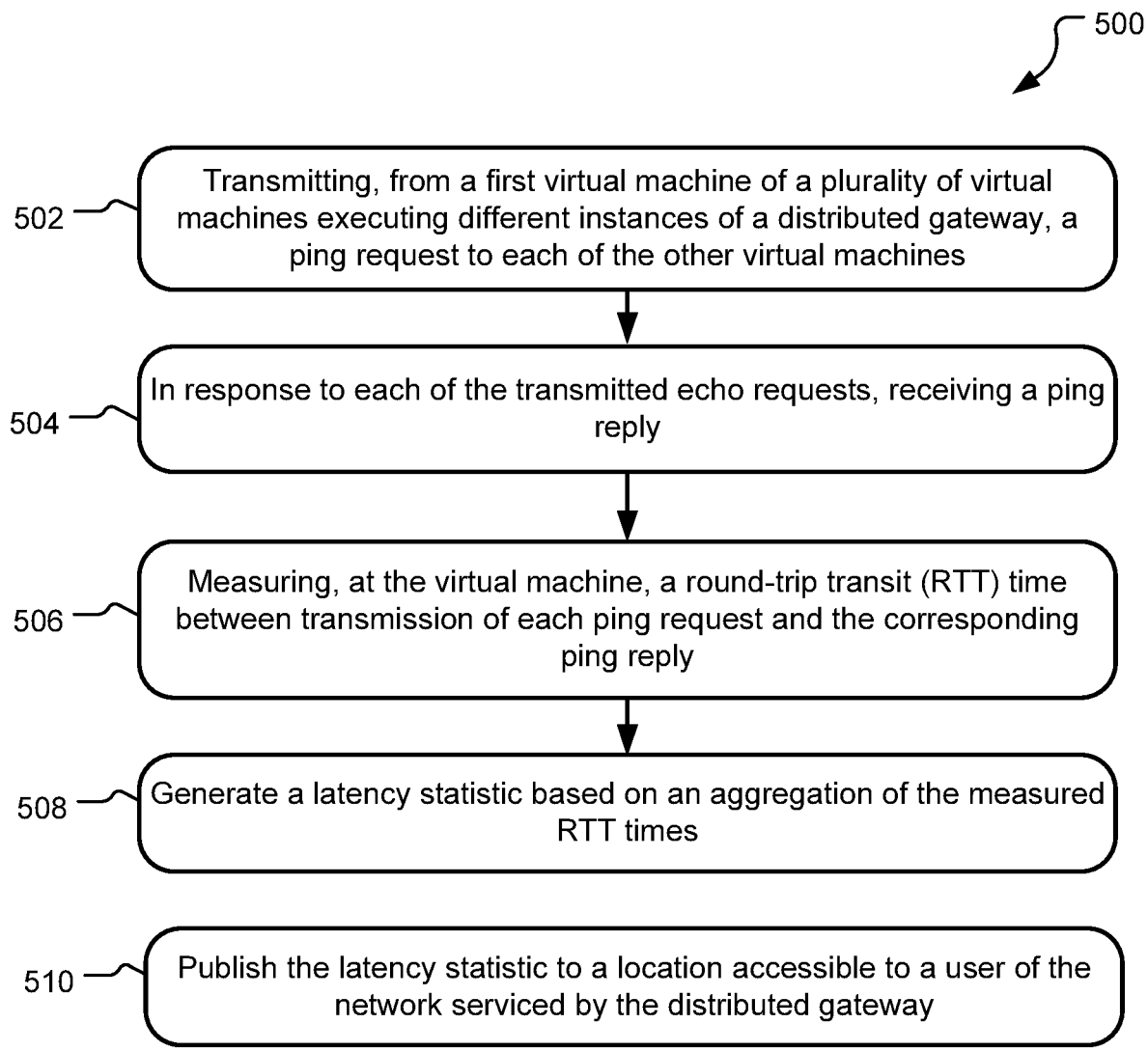
FIG. 5 illustrates example operations for measuring latency of a distributed gateway.

FIG. 5 illustrates example operations 500 for measuring latency of a distributed gateway. In one implementation, the distributed gateway includes a multiple virtual machines each executing a different instance of a gateway and a load balancer that distributes traffic of a user network among the multiple virtual machines executing the gateway for processing. A transmission operation 502 transmits, from a first virtual machine of the distributed gateway, a ping request to each of the other virtual machines in the distributed gateway. A receiving operation 504 receives, in response to each one of the transmitted ping requests, a ping reply at the first virtual machine. A measurement operation 506 measures a round-trip travel (RTT) time between transmission of each ping request and receipt of the corresponding ping reply. An aggregating operation 508 aggregates the measurements to generate a latency statistic for the distributed gateway (e.g., an average RTT time of the ping requests/ping replays representing an average latency). In one implementation, the aggregation operations aggregates measurements of RTT times, collected as described above, by each different one of the virtual machines within the distributed gateway. A publishing operation 510 publishes the latency statistic to a location accessible to a user of the network serviced by the distributed gateway. For example, the latency statistic is published to a web-based customer portal hosted by a distributed gateway service provider where the user can log-in to view account-specific information.

Figure 6:
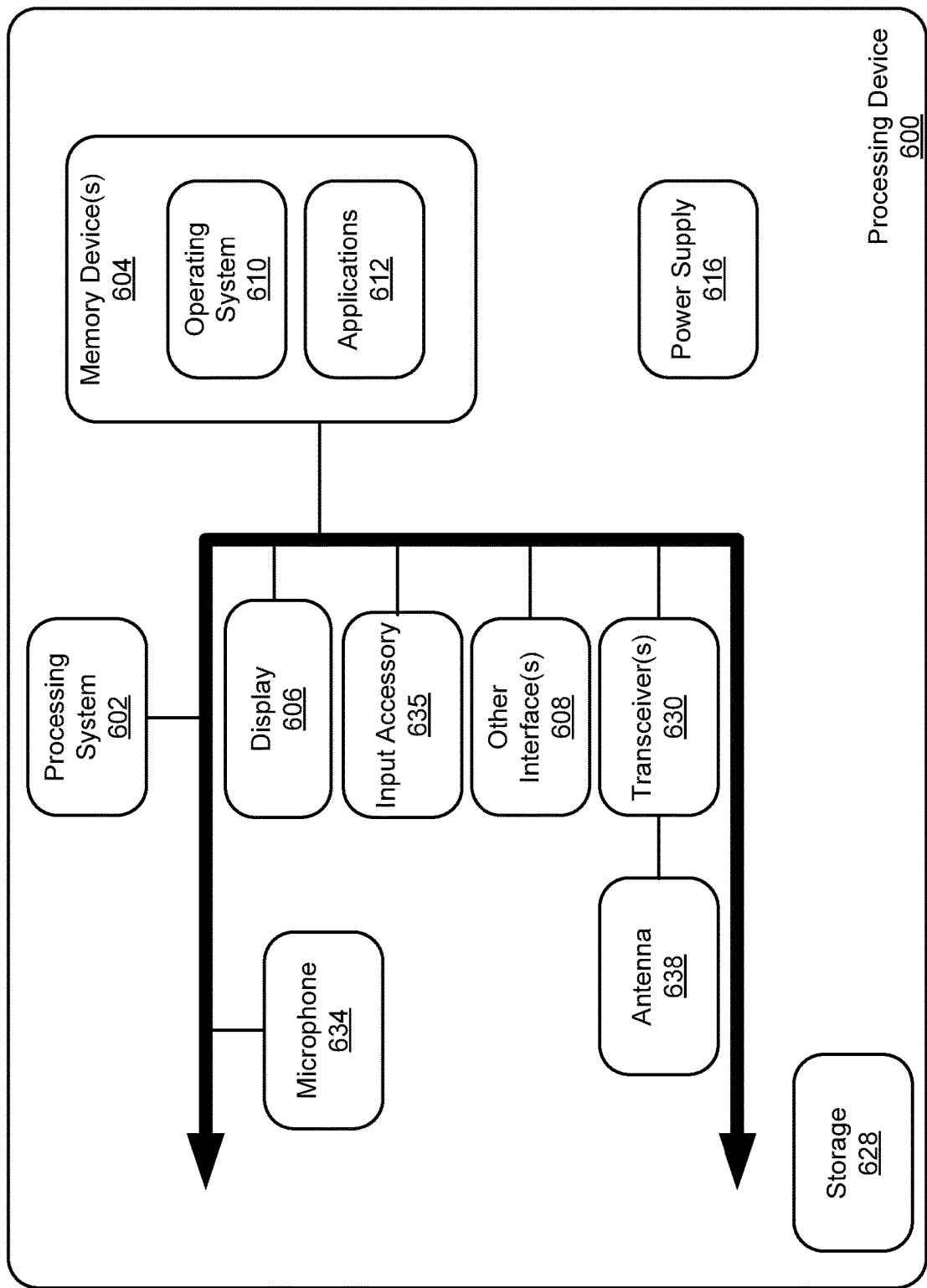
FIG. 6 illustrates an example schematic of a processing device suitable for implementing aspects of the disclosed technology.

FIG. 6 illustrates an example schematic of a processing device 600 suitable for implementing aspects of the disclosed technology. In one implementation, the processing device 600 hosts a virtual machine that instantiates a gateway, such as a firewall. The processing device 600 may be one of multiple processing devices hosting various virtual machines running different instances of the gateway on behalf of a same user network within a distributed gateway system. In another implementation, the processing device 600 is a user computing device that is configured for communication with a distributed gateway as described herein.

The processing device 600 includes a processing system 602, memory device(s) 604, a display 606, and other interfaces 608 (e.g., buttons). The processing system 602 may each include one or more CPUs, GPUs, etc.

The memory 604 generally includes both volatile memory (e.g., RAM) and non-volatile memory (e.g., flash memory). An operating system 610 may reside in the memory 604 and be executed by the processing system 602. A gateway may also be stored in the memory 604 or in distributed memory of multiple different storage devices.

One or more applications 612 (e.g., a gateway instantiated on various VMs in the distributed gateway 202, the latency measurement agent 112) are loaded in the memory 604 and executed on the operating system 610 by the processing system 602. The applications 612 may receive inputs from one another as well as from various input local devices such as a microphone 634, input accessory 635 (e.g., keypad, mouse, stylus, touchpad, gamepad, racing wheel, joystick), and a camera 632.

Additionally, the applications 612 may receive input from one or more remote devices, such as remotely-located smart devices, by communicating with such devices over a wired or wireless network using more communication transceivers 630 and an antenna 638 to provide network connectivity (e.g., a mobile phone network, Wi-Fi®, Bluetooth®). The processing device 600 may also include one or more storage devices 628 (e.g., non-volatile storage). Other configurations may also be employed. The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared, and other wireless media.

(A1) An example method disclosed herein facilitates estimation of latency incurred by a data packet passing through a distributed gateway. The method includes transmitting, from a first virtual machine of a plurality of virtual machines executing different instances of a gateway, a ping request to each of the other virtual machines; receiving, in response to each of the transmitted ping requests, a ping response at the first virtual machine; and measuring, at the first virtual machine, a round-trip transit (RTT) time between transmission of each one of the ping requests and receipt of the corresponding ping response. The method further provides for publishing a latency statistic for the distributed gateway that is based on an aggregation of the RTT times measured by the first virtual machine.

The method of A1 is advantageous at least because data packets subjected to measurements are separate from the user traffic that is processed by the gateway. Consequently, the latency measurements do not themselves contribute additional latency to the user data packets.

(A2) In some implementations of A1, the distributed gateway is a distributed firewall and each of the instances of the gateway inspect a portion of traffic that is in transit to or from a user network. The latency statistic provides an estimate of the latency that the distributed firewall imparts on user data packets passing through it.

(A3) In some implementations of A 1 or A2, method further includes transmitting, from each one of the virtual machines executing one of the instances of the gateway, a ping request to each of the other virtual machines and measuring, at each one of the virtual machines, the round-trip transit (RTT) time between transmission of the ping requests transmitted by the virtual machine and a corresponding ping response received by the virtual machine. The latency statistic for the distributed gateway is based on an aggregation of the RTT times measured by each of the virtual machines. The method of A3 is beneficial because the latency statistic is based on a measured RTT for a plurality of paths that a user data packet could traverse when passing through the distributed gateway.

(A4) In some implementations of A1-A2, the distributed gateway includes a load balancer that is an inactive component. In such an implementation, the load balancer does not contribute any latencies to user data packets and the virtual machines are responsible for all or substantially all latencies experienced by the user data packets (e.g., latency due to travel to the virtual machines and processing by the virtual machines). The disclosed latency estimation methods are, in this case, more accurate because they are based on measurements representative of all or substantially all sources of latency.

(A5) In some implementations of A1-A4, the distributed gateway includes a load balancer that is an active component, and the ping requests are each routed through the load balancer in route to destination hosts selected from the virtual machines. In such an implementation, the load balancer does contribute latencies to the user data packets but the methodology accurately estimates this latency contribution since the ping requests are routed through the load balancer and are therefore subjected to the same resulting latencies as the user data packets.

(A6) In some implementations of A1-A5 the latency statistic includes an average latency corresponding to an average of the RTT times measured by the virtual machines. This is beneficial assuming an even distribution of traffic among the virtual machines of the distributed gateway because the average RTT times do, in such case, accurately correspond to the average latency experienced by a user data packet.

(A7) In some implementations of A1-A6, the ping requests are transmitted by each one of the virtual machines of the distributed gateway to every other one of the virtual machines of the distributed gateway. Each of the virtual machines measures a plurality of RTT times between transmission of each ping request and receipt of a corresponding reply. The latency statistic is based on an aggregation of the plurality of RTT times measured by each one of the different virtual machines in the distributed gateway. The method of A7 is beneficial because the latency statistic is based on a measured RTT for each possible path that a user data packet could traverse when passing through the distributed gateway.

(A8) In some implementations of A1-A6, the distributed gateway is configured to automatically scale a number of the virtual machines executing the instances of the gateway in response to changes in volume of received user traffic. The latency statistic is dynamically re-computed responsive to each change in the number of the virtual machines within the distributed gateway. This methodology ensures that the latency statistic is more accurate due to the fact that it is based on RTT times associated with all data packet paths available at the corresponding point in time.

In another aspect, some implementations include a computing system for estimating latency incurred by a data packet passing through a distributed gateway. The computing system includes hardware logic circuitry that is configured to perform any of the methods described herein (e.g., methods A1-A8).

In yet another aspect, some implementations include a computer-readable storage medium for storing computer-readable instructions. The computer-readable instructions, when executed by one or more hardware processors, perform any of the methods described herein (e.g., methods A1-A8).

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method for estimating latency incurred by a data packet passing through a distributed gateway, the method comprising:
    transmitting, from each of multiple virtual machines executing different instances of a gateway, a ping request to a load balancer that redirects the ping to a select one of the multiple virtual machines;
    receiving, at each of the multiple virtual machines, a ping response in response to each of the transmitted ping requests;
    measuring, for each of the multiple virtual machines, a round-trip transit (RU) time between transmission of each one of the ping requests and receipt of the corresponding ping response;
    estimating an average latency incurred by a group of data packets directed through the distributed gateway by the load balancer, the average latency being based on an aggregation of the RU times measured for each of the multiple virtual machines; and
    publishing the average latency as a latency statistic for the distributed gateway.

2. The method of claim 1, wherein the distributed gateway is a distributed firewall and each of the instances of the gateway inspect a portion of traffic that is in transit to or from a user network.

3. The method of claim 1, wherein the load balancer is an active component.

4. The method of claim 1, wherein the average latency is based on an aggregation of the RTT times measured for each of the virtual machines.

5. The method of claim 1, wherein the ping requests are transmitted by each one of the virtual machines of the distributed gateway and through the load balancer to every other one of the multiple virtual machines of the distributed gateway, and wherein each of the multiple virtual machines measures a plurality of RU times between transmission of each ping request and receipt of a corresponding reply.

6. The method of claim 1, wherein the distributed gateway is configured to automatically scale a number of the virtual machines executing the instances of the gateway in response to changes in volume of received user traffic and wherein the latency statistic is dynamically re-computed responsive to each change in the number of the virtual machines within the distributed gateway.

7. A system for measuring latency of a data packet in transit through a distributed gateway having a plurality of virtual machines each executing different instances of a gateway on behalf of a user network, the system comprising: latency measurement agent stored in memory of each of the virtual machines, the latency measurement agent being executable to:
    transmit multiple ping requests to a load balancer that redirects each of the multiple ping request to a select virtual machine of the plurality of virtual machines;
    receive a ping response in response to each of the transmitted ping requests; and
    measure a round-trip transit (RU) time between transmission of each one of the ping requests and receipt of the corresponding ping response;
    estimate an average latency incurred by a group of data packets directed through the distributed gateway by the load balancer, the average latency based on an aggregation of the RU times measured in association with each ping request and the corresponding ping response; and
    a latency metric manager stored in the memory that is executable to publish the average latency as a latency statistic for the distributed gateway.

8. The system of claim 7, wherein the distributed gateway is a distributed firewall and each of the instances of the gateway inspect a portion of traffic that is in transit to or from the user network.

9. The system of claim 7, wherein the latency statistic includes an average latency corresponding to an average of the RTT times measured by the virtual machines.

10. The system of claim 7, wherein the latency metric manager publishes the latency metric to a web-based portal viewable by a customer that provides account credentials associated with the user network.

11. The system of claim 7, wherein the load balancer is an active component.

12. The method of claim 1, wherein the distributed gateway is configured to automatically scale a number of the virtual machines executing the instances of the gateway in response to changes in volume of received user traffic and wherein the method further comprises: re-computing the latency statistic responsive to each change in the number of the virtual machines within the distributed gateway.

13. One or more non-transitory computer-readable storage media encoding computer-executable instructions for a computer process that measures latency of a data packet in transit through a distributed gateway through gateway having a plurality of virtual machines each executing different instances of a gateway on behalf of a user network, the computer process comprising:
    transmitting, from each of multiple virtual machines of the plurality of virtual machines executing different instances of the gateway, a ping request to a load balancer that redirects the ping request to a select virtual machine of the other virtual machines in the plurality of virtual machines;
    receiving, at each of the multiple virtual machines, a ping response in response to each of the transmitted ping requests;
    measuring, for each of the multiple virtual machines, a round-trip transit (RTT) time between transmission of each one of the ping requests and receipt of the corresponding ping response;
    estimating an average latency incurred by a group of data packets directed through the distributed gateway by the load balancer, the average latency being based on an aggregation of the RTT times measured for each of the multiple virtual machines; and
    publishing the average latency as a latency statistic for the distributed gateway.

14. The one or more non-transitory computer-readable storage media of claim 13, wherein the latency statistic includes an average latency corresponding to an average of the RTT times measured for each of the multiple virtual machines.

15. The one or more non-transitory computer-readable storage media of claim 13, wherein the distributed gateway includes a load balancer that is an active component, and wherein the ping requests are each routed through the load balancer in route to destination hosts selected from the virtual machines.

16. The one or more non-transitory computer-readable storage media of claim 13, wherein the distributed gateway is configured to automatically scale a number of the virtual machines executing the instances of the gateway in response to changes in volume of received user traffic, and wherein the computer process further comprises dynamically re-computing the latency statistic responsive to each change in the number of the virtual machines within the distributed gateway.

* * * * *